United States Patent

Shimazaki

[11] Patent Number: 5,905,816
[45] Date of Patent: *May 18, 1999

[54] METHOD OF AND APPARATUS FOR BINARIZING IMAGE SIGNALS

[75] Inventor: Osamu Shimazaki, Kanagawa-ken, Japan

[73] Assignee: Fuji Photo Film Co., Ltd., Kanagawa-ken, Japan

[*] Notice: This patent is subject to a terminal disclaimer.

[21] Appl. No.: 08/839,949

[22] Filed: Apr. 24, 1997

Related U.S. Application Data

[63] Continuation of application No. 08/432,967, May 1, 1995, Pat. No. 5,696,846.

[30] Foreign Application Priority Data

May 10, 1994 [JP] Japan ................................. 6-96643

[51] Int. Cl.[6] .............................. G06K 9/40; H04N 5/84
[52] U.S. Cl. ..................... 382/254; 382/252; 382/260; 358/348
[58] Field of Search ................................. 382/254, 252, 382/270, 260; 358/348

[56] References Cited

U.S. PATENT DOCUMENTS 5,307,425  4/1994  Otsuka ................................. 382/254
5,696,846  12/1997 Shimazaki ............................ 382/254

*Primary Examiner*—Andrew W. Johns
*Assistant Examiner*—Monica S. Davis
*Attorney, Agent, or Firm*—Sughrue, Mion, Zinn, Macpeak & Seas, PLLC

[57] ABSTRACT

A multi-valued image signal I(x,y) is compared with a threshold signal TH by a comparator to produce a binary image signal P(x,y), and an error signal E(x,y) is determined from the binary image signal P(x,y) and the multi-valued image signal I(x,y). Error diffusion coefficients W1(k,l), W2(k,l), W3(k,l) are prepared in advance which correspond respectively to the filter characteristics of a "Jarvis-type filter", an "elongate rectangular filter", and a "Floyd-type filter". A mixing ratio setting circuit determines mixing ratios $t1(I_0)$, $t2(I_0)$, $t3(I_0)$ depending on the multi-valued image signal. The mixing ratios $t1(I_0)$, $t2(I_0)$, $t3(I_0)$ are accumulated and added to the error diffusion coefficients W1(k,l), W2(k,l), W3(k,l), and an error signal E(x−k,y−l) and an error diffusion coefficient $W(k,l,I_0)$ are accumulated and added, producing a diffusion error signal ΔE(x,y). The diffusion error signal ΔE(x,y) is added to the multi-valued image signal $I_0(x,y)$, producing a corrected multi-valued image signal I(x,y), which is then compared with the threshold signal TH by the comparator to generate a binary image signal P(x,y).

2 Claims, 4 Drawing Sheets

FIG.4A (x-1, y-1) (x, y-1) (x+1, y-1)

| 1 / 1 6 | 5 / 1 6 | 3 / 1 6 |
|---|---|---|
| 7 / 1 6 | * | |

| 1 / 4 0 | 3 / 4 0 | 5 / 4 0 | 7 / 4 0 | 5 / 4 0 | 3 / 4 0 | 1 / 4 0 |
|---|---|---|---|---|---|---|
| 3 / 4 0 | 5 / 4 0 | 7 / 4 0 | * | | | |

FIG.4C

| 1 / 4 8 | 3 / 4 8 | 5 / 4 8 | 3 / 4 8 | 1 / 4 8 |
|---|---|---|---|---|
| 3 / 4 8 | 5 / 4 8 | 7 / 4 8 | 5 / 4 8 | 3 / 4 8 |
| | 5 / 4 8 | 7 / 4 8 | * | |

METHOD OF AND APPARATUS FOR BINARIZING IMAGE SIGNALS

This is a continuation of application Ser. No. 08/432,967, filed May 1, 1995, now U.S. Pat. No. 5,696,846.

BACKGROUND OF THE INVENTION

1. Field of the Invention

The present invention relates to a method of and an apparatus for binarizing an image signal based on an error diffusion process.

2. Description of the Related Art

For reproducing a gradation image on a display unit or a printer which is capable of displaying only binary representations, a supplied gradation image signal which is a multi-valued image signal is converted into a binary image signaled made up of only 0s and 1s. There is known an error diffusion process for binarizing a multi-valued image signal.

According to the error diffusion process, when a multi-valued image signal representing an input pixel is converted into a binary image signal by comparison with a threshold signal, an error produced by the binarization is distributed and added to pixels in the vicinity of the input pixel, and a resultant multi-valued image signal is binarized as a new multi-valued image signal representing the input pixel.

If it is assumed that a multi-valued image signal representing an input pixel (x,y) is represented by I(x,y) (x indicates the position of the input pixel in a main scanning direction and y indicates the position of the input pixel in an auxiliary scanning direction) and a binary image signal converted from the multi-valued image signal is represented by P(x,y), then a binarization error signal E(x,y) is expressed by:

$$E(x,y) = I(x,y) - P(x,y). \quad (1)$$

The binarization error signal E(x,y) determined according to the equation (1) is diffused into nearby pixels around the pixel (x,y) under consideration, according to equation (2):

$$I(x,y) = I_0(x,y) + \Delta E(x,y), \quad (2)$$

replacing the multi-valued image signal I(x,y) representing the input pixel. The replaced multi-valued image signal I(x,y) is compared with a predetermined threshold signal, producing a binary image signal P(x,y). In the equation (2), $$\Delta E(x, y) = \sum^{k} \sum^{l} W(k, l) \cdot E(x-k, y-l) \quad (3)$$

where W(k,l) represents an error diffusion coefficient which is used to diffuse the binarization error signal E(x,y) at a certain ratio.

The above error diffusion process for converting multi-valued image signals into binary image signals is effective in reproducing continuous gradation signals representing halftone-dot images or photographic images while suppressing the generation of moiré patterns.

However, the error diffusion process is disadvantageous in that it allows a striped pattern peculiar to a binarized image or an undesirable texture (fine pattern) in a range of certain density levels to be generated depending on the manner in which the error diffusion coefficient W(k,l) is established. Furthermore, a dot pattern having different densities in main and auxiliary scanning directions may be produced thereby giving raise to some periodical image patterns.

For example; if a "Floyd-type filter" is used (see FIG. 4A of the accompanying drawings where * represents a pixel under consideration) for establishing error diffusion coefficients W(k−1,1−1), W(k,1−1), W(k+1,1−1), W(k−1,1) respectively with respect to multi-valued image signals I(x−1,y−1), I(x,y−1), I(x+1,y−1), I(x−1,y) that are located within two pixels from a multi-valued image signal I(x,y) of a pixel under consideration then a dot pattern is produced which is dense in a main scanning direction and coarse in an auxiliary scanning direction in highlight and shadow ranges of a binarized halftone dot image, making the image form with noticeable regular patterns, and a distinct staggered texture appears in intermediate-density ranges.

If an "elongate rectangular filter" is used (see FIG. 4B of the accompanying drawings) for establishing an error diffusion coefficient W(k,l) with respect to a multi-valued image signal I(x,y) that is located within four pixels in a main scanning direction and two pixels in an auxiliary scanning direction from a multi-valued image signal I(x,y) of a pixel under consideration then a texture which is long in the main scanning direction is generated in intermediate-density ranges of a binarized halftone dot image, and a dot pattern is-produced which is dense in the main scanning direction and coarse in the auxiliary scanning direction in ranges of the binarized halftone dot image except for high-light ranges, intermediate-density ranges, and shadow ranges.

If a "Jarvis-type filter" is used (see FIG. 4C of the accompanying drawings) for establishing an error diffusion coefficient W(k,l) with respect to a multi-valued image signal I(x,y) that is located within three pixels from a multi-valued image signal I(x,y) of a pixel under consideration then a dot pattern is produced which is dense in a main scanning direction and coarse in an auxiliary scanning direction in highlight and shadow ranges of a binarized halftone dot image, and a peculiar striped pattern is generated in ranges of the binarized halftone dot image except for highlight ranges, intermediate-density ranges, and shadow ranges.

SUMMARY OF THE INVENTION

It is therefore an object of the present invention to provide a method of and an apparatus for binarizing an image signal based on an error diffusion process to produce an image which is free of undesirable textures and periods image patterns.

The above object can be achieved in accordance with the present invention by an apparatus for producing a binary image signal, comprising comparing means for comparing a multi-valued image signal with a predetermined threshold signal thereby to produce a binary image signal, error signal calculating means for determining an error signal based on the difference between the multi-valued image signal and the binary image signal, error diffusion coefficient setting means for establishing an error diffusion coefficient to diffuse the error signal into multi-valued image signals around the multi-valued image signal, depending on the multi-valued image signal, and means for correcting the multi-valued image signal with the error signal which has been weighted by the error diffusion coefficient.

The above object can also be accomplished by a method of producing a binary image signal, comprising the steps of comparing a multi-valued image signal with a predetermined threshold signal thereby to produce a binary image signal, determining an error signal based on the difference between the multi-valued image signal and the binary image signal, establishing an error diffusion coefficient to diffuse the error signal into multi-valued image signals around the multi-valued image signal, depending on the multi-valued image signal, diffusing the error signal with the error diffusion coefficient, and correcting the multi-valued image signal with the error signal which has been weighted by the error diffusion coefficient.

With the above apparatus and method according to the present invention, a multi-valued signal is compared with a threshold signal to produce a binary image signal, and corrected using an error signal which represents the difference between the binary image signal and the multi-valued image signal. At this time, the error signal is diffused into surrounding pixels using an error diffusion coefficient that has been established depending on the multi-valued image signal, and applied to the multi-valued image signal, for thereby generating a good binary image signal which is free from the generation of textures and periodis image patterns.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 4A is a diagram illustrative of a "Floyd-type filter";

FIG. 4B is a diagram illustrative of an "elongate rectangular filter"; and

FIG. 4C is a diagram illustrative of a "Jarvis-type filter".

DETAILED DESCRIPTION OF THE PREFERRED EMBODIMENTS

Figure 1:
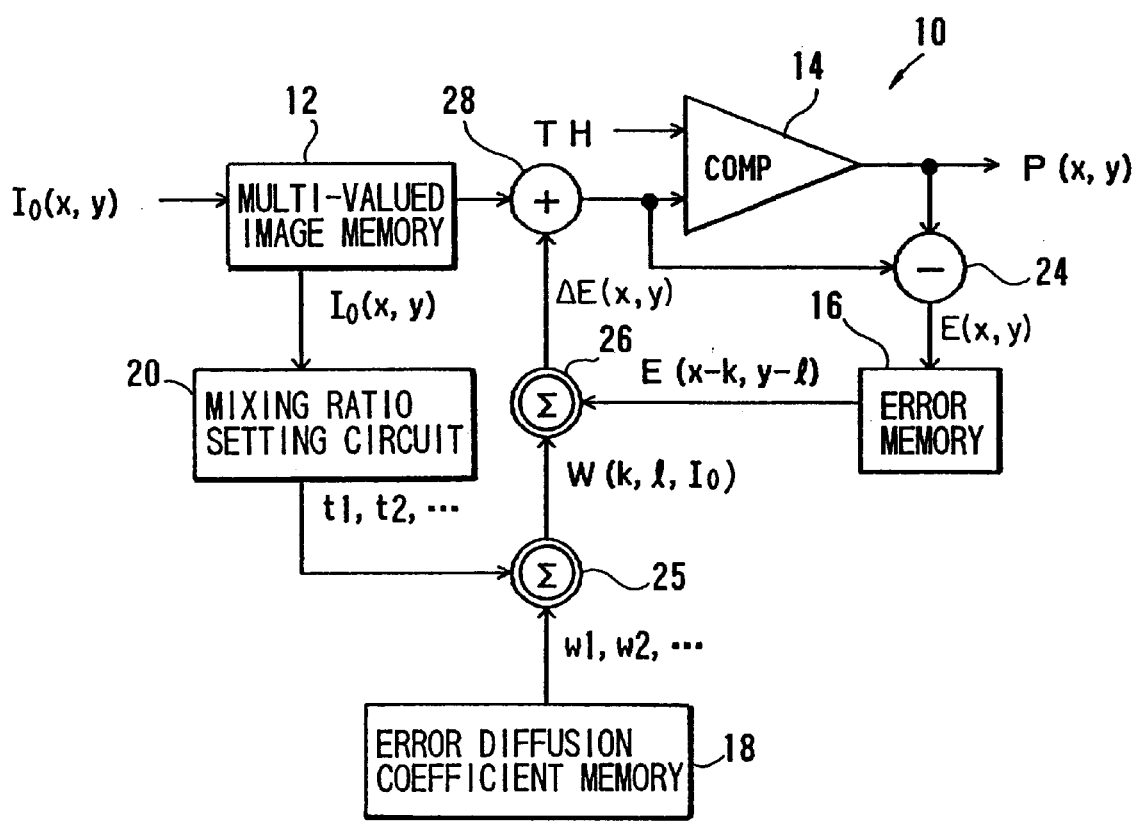
FIG. 1 is a block diagram of an error diffusing circuit which incorporates an apparatus for binarizing an image signal according to the present invention.

Like or corresponding reference numerals denote like or corresponding parts throughout the views.

FIG. 1 shows in block form an error diffusing circuit 10 which incorporates an apparatus for binarizing an image signal according to the present invention.

As shown in FIG. 1, the error diffusing circuit 10 generally comprises a multi-valued image memory 12 for storing a multi-valued image signal I(x,y), a comparator 14 (comparing means) for comparing the multi-valued image signal I(x,y) with a predetermined threshold signal TH to produce a binary image signal P(x,y), an error memory 16 for storing the difference between the multi-valued image signal I(x,y) and the binary image signal P(x,y) as an error signal E(x,y), an error diffusion coefficient memory 18 for storing a plurality of error diffusion coefficients W1(k,l), W2(k,l), . . . of different diffusion degrees, and a mixing ratio setting circuit 20 for setting mixing ratios for the error diffusion coefficients W1(k,l), W2(k,l), . . . respectively to $t1(I_0)$, $t2(I_0)$, . . . ($t1(I_0)+t2(I_0)+ \ldots =1$) depending on the multi-valued image signal I(x,y). In FIG. 1, "x" represents the position of an image (pixel) in a main scanning direction, "y" represents the position of an image (pixel) in an auxiliary scanning direction, "k" and "l" represent a range of pixels positioned around a pixel that is specified by (x,y).

The error signal E(x,y) is determined as the difference between the multi-valued image signal I(x,y) and the binary image signal P(x,y) by a subtractor 24 (error signal calculating means). The mixing ratios $t1(I_0)$, $t2(I_0)$, . . . and the error diffusion coefficients W1(k,l), W2(k,l), . . . are accumulated and added into an error diffusion coefficient W(k,l,$I_0$) by an accumulating adder 25. An error signal E(x−k, y−1) from the error memory 16 and the error diffusion coefficient W(k,l,$I_0$) from the accumulating adder 25 are accumulated and added by an accumulating adder 26, which supplies a sum signal to an adder 28. The error diffusion coefficient W(k,l,$I_0$) is represented by:

$$W(k,l,I_0)=t1(I_0)\cdot W1(k,l)+t2(I_0)\cdot W2(k,l)+ \qquad (4)$$

Operation of the error diffusing circuit 10 will be described below.

A multi-valued image signal I(x,y) is stored in the multi-valued image memory 12 and then supplied through the adder 28 to the comparator 14. The comparator 14 compares the multi-valued image signal I(x,y) with a predetermined threshold signal TH to produce a binary image signal P(x,y). The relationship between the multi-valued image signal I(x,y) and the binary image signal P(x,y) is expressed as follows:

$$P(x, y) = 0 \quad (I(x, y) < TH) \qquad (5)$$
$$\phantom{P(x, y) =} 1 \quad (I(x, y) \geq TH).$$

The binary image signal P(x,y) outputted from the comparator 14 is supplied to the subtractor 24, which determines an error signal E(x,y) represented by:

$$E(x,y)=I(x,y)-P(x,y). \qquad (6)$$

The error signal E(x,y) is stored in the error memory 16.

In the calculation of the equation (6), if the multi-valued image signal I(x,y) is of 8-bit data, then the binary image signal P(x,y) is converted into 8-bit data according to the following equation (5)':

$$P(x, y) = 0 \quad (I(x, y) < TH) \qquad (5)'$$
$$\phantom{P(x, y) =} 255 \quad (I(x, y) \geq TH).$$

The mixing ratio setting circuit 20 establishes mixing ratios $t1(I_0)$, $t2(I_0)$, . . . depending on the multi-valued image signal $I_0$(x,y), and supplies the established mixing ratios $t1(I_0)$, $t2(I_0)$, . . . to the accumulating adder 25. The error diffusion coefficient memory 18 supplies the stored error diffusion coefficients W1(k,l), W2(k,l), . . . to the accumulating adder 25. As a result, the accumulating adder 25 produces the error diffusion coefficient W(k,l,$I_0$) represented by the equation (4) above.

The error diffusion coefficient W(k,l,$I_0$) and the error signal E(x−k,y−1) are accumulated and added by the accumulating adder 26, which produces, as a sum signal, a diffusion error signal $\Delta E(x,y)$ represented by the following equation (7):

$$\Delta E(x, y) = \sum^{k} \sum^{l} W(k, l, I_0)\cdot E(x-k, y-l). \qquad (7)$$

where $I_0$ indicates a multi-valued image signal from the pixel (x,y).

The diffusion error signal $\Delta E(x,y)$ is then added to the multi-valued image signal $I_0$(x,y) by the adder 28, which produces, as a sum signal, a corrected multi-valued image signal I(x,y) represented by the following equation (8):

$$I(x,y) = I_0(x,y) + \Delta E(x,y). \qquad (8)$$

The corrected multi-valued image signal I(x,y) is compared with the threshold signal TH by the comparator 14, which outputs a binary image signal P(x,y).

The error diffusion coefficient $W(k,l,I_0)$ is established; for example, as:

$$W(k,l,I_0) = t1(I_0) \cdot W1(k,l) + t2(I_0) \cdot W2(k,l) + t3(I_0) \cdot W3(k,l) \qquad (4)'$$

With respect to the error diffusion coefficient W1(k,l), the "Floyd-type filter" (see FIG. 4A) is employed which establishes the error diffusion coefficient W1(k,1) with respect to multi-valued image signals that are located within two pixels from a multi-valued image signal I(x,y) of a pixel under consideration. With respect to the error diffusion coefficient W2(k,l), the "elongate rectangular filter" (see FIG. 4B) is employed which establishes the error diffusion coefficient W2(k,l) with respect to a multi-valued image signal I(x,y) that is located within four pixels in the main scanning direction and two pixels in the auxiliary scanning direction from a multi-valued image signal I(x,y) of a pixel under consideration. With respect to the error diffusion coefficient W3(k,l), the "Jarvis-type filter" (see FIG. 4C) is employed which establishes the error diffusion coefficient W3(k,l) with respect to multi-valued image signals that are located within three pixels from a multi-valued image signal I(x,y) of a pixel under consideration. The mixing ratios $t1(I_0)$, $t2(I_0)$, $t3(I_0)$ are set, as shown in FIGS. 2A, 2B, and 2C, such that $t1(I_0) = t3(I_0) = 0$ and $t2(I_0) = 1$ if the density of the multi-valued image signal $I_0(x,y)$ is in highlight and shadow ranges, $t1(I_0) = t2(I_0) = 0$ and $t3(I_0) = 1$ if the density of the multi-valued image signal $I_0(x,y)$ is in an intermediate range, and $t1(I_0) = 1$, $t2(I_0) = t3(I_0) = 0$ if the density of the multi-valued image signal $I_0(x,y)$ is otherwise.

With the error diffusion coefficients W1(k,l), W2(k,l), W3(k,l) and the mixing ratios $t1(I_0)$; $t2(I_0)$, $t3(I_0)$ being thus established, the "Jarvis-type filter" functions for the intermediate-density range of the multi-valued image signal I(x,y) to suppress the generation of textures, the "elongate rectangular filter" functions for the highlight and shadow ranges of the multi-valued image signal I(x,y) to lower the visibility of periodis image patterns in the main and auxiliary scanning directions, and the "Floyd-type filter" functions for other density ranges, thereby generating a good binary image signal P(x,y). Consequently, drawbacks of the above filters are compensated for depending on the density of the multi-valued image signal I(x,y), making it possible to produce a good binary image signal P(x,y) which is free from characteristic textures in all density ranges, has dot patterns that are coarse and dense isotropically, and suffers less periodical image patterns.

Figure 3:
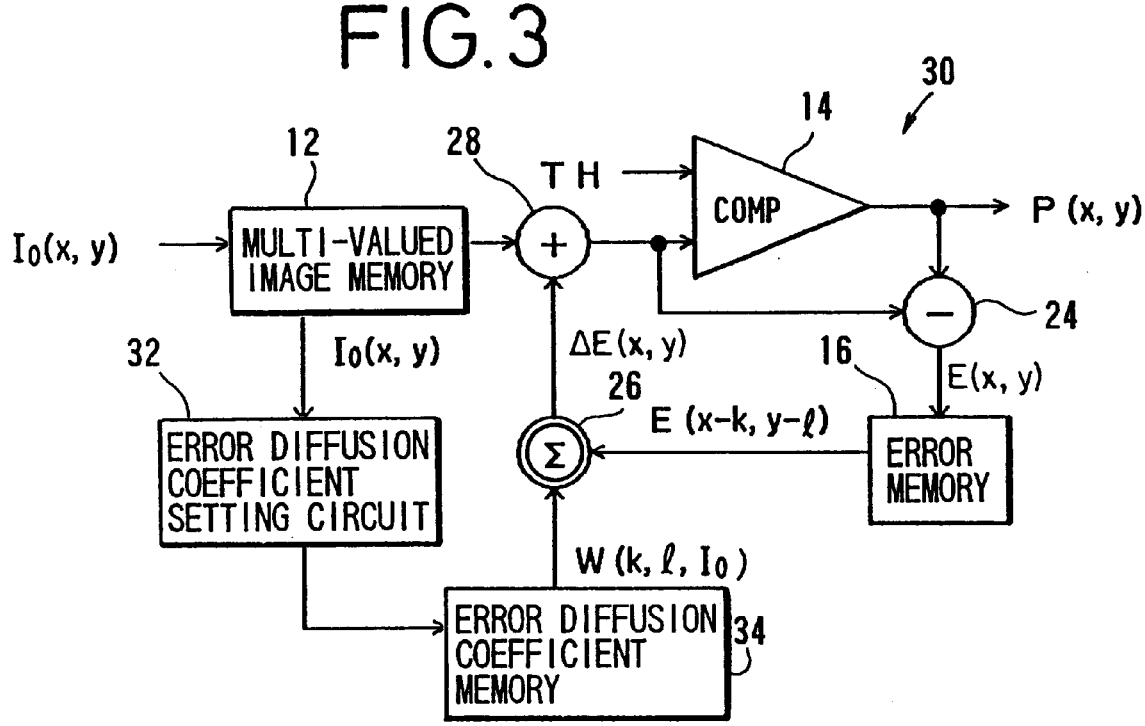
FIG. 3 is a block diagram of an error diffusing circuit according to another embodiment which incorporates an apparatus for binarizing an image signal according to the present invention.

FIG. 3 shows in block form an error diffusing circuit according to another embodiment which incorporates an apparatus for binarizing an image signal according to the present invention. As shown in FIG. 3, the error diffusing circuit, generally denoted as 30, comprises a multi-valued image memory 12; a comparator 14, an error memory 16, a subtractor 24, an accumulating adder 26, and an adder 28, which are identical to those shown in FIG. 1. The error diffusing circuit 30 also has an error diffusion coefficient setting circuit 32 for calculating an error diffusion coefficient $W(k,l,I_0)$ based on a multi-valued image signal I(x,y), and an error diffusion coefficient memory 34 for storing the error diffusion coefficient $W(k,l,I_0)$ calculated by the error diffusion coefficient setting circuit 32. An error signal E(x−k,y−1) from the error memory 16 and the error diffusion coefficient $W(k,l,I_0)$ from the error diffusion coefficient memory 34 are accumulated and added by the accumulating adder 26, which produces, as a sum signal, a diffusion error signal $\Delta E(x,y)$ represented by the above equation (7). The diffusion error signal $\Delta E(x,y)$ is added to the multi-valued image signal $I_0(x,y)$ the adder 28, which produces, as a sum signal, a corrected multi-valued image signal I(x,y).

Figure 2:
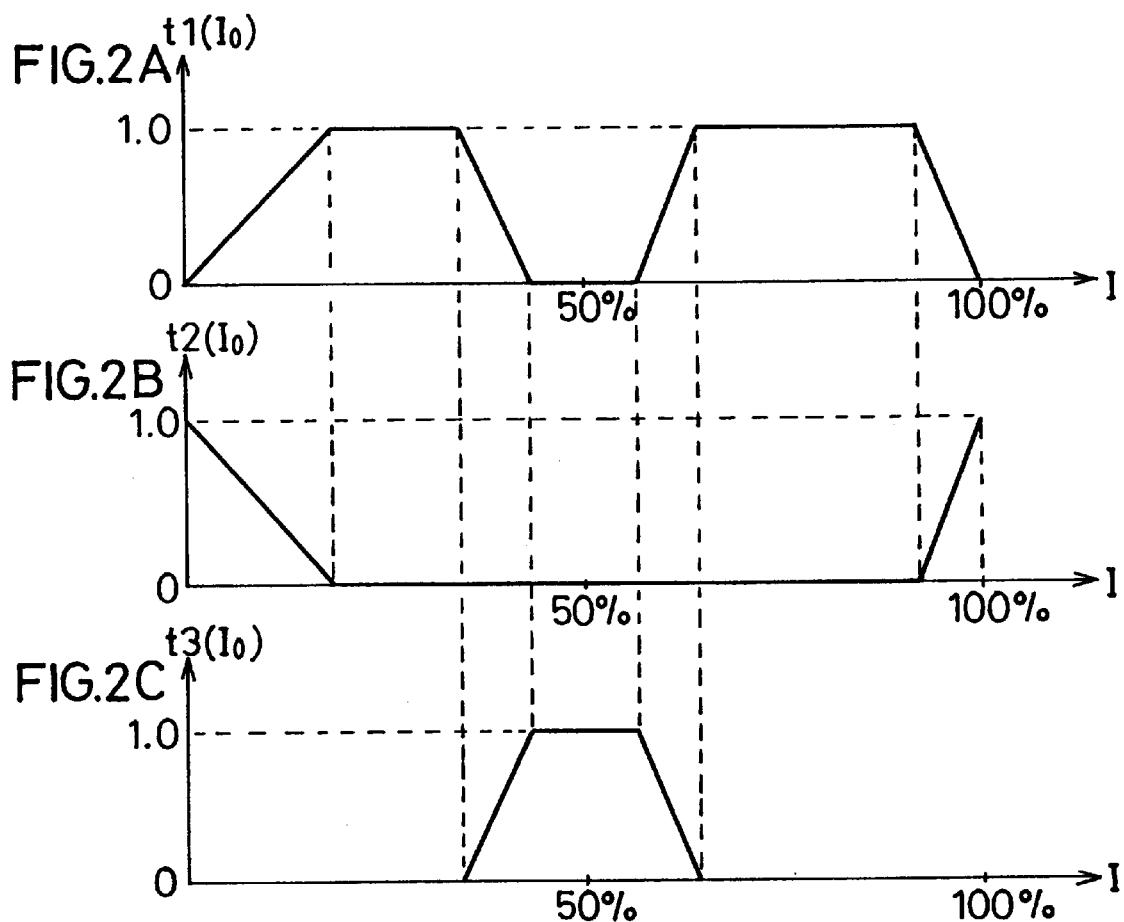
FIGS. 2A, 2B and 2C are diagrams illustrative of mixing ratios that are established in a mixing ratio setting circuit in the error diffusing circuit shown in FIG. 1.

The error diffusion coefficient $W(k,l,I_0)$ may be established according to the above equation (4), using the mixing ratios $t1(I_0)$, $t2(I_0)$, . . . and the error diffusion coefficients W1(k,l), W2(k,1), . . . shown in FIGS. 2A through 2C. The error diffusing circuit 30 according to the embodiment shown in FIG. 3 can also produce a good binary image signal P(x,y) in the same manner as the error diffusing circuit 10 according to the embodiment shown in FIG. 1.

The error diffusing process which has been described as being carried out by the error diffusing circuits 10, 30 may be software-implemented by a computer.

Although certain preferred embodiments of the present invention has been shown and described in detail, it should be understood that various changes and modifications may be made therein without departing from the scope of the appended claims.

What is claimed is:

1. An apparatus for producing a binary image signal comprising:

a comparing means for comparing a multi-valued image signal of a target pixel with a threshold signal to produce a binary image signal;

an error signal calculating means for determining an error signal based on a difference between said multi-valued image signal and said binary image signal;

an error diffusion coefficient setting means for receiving a density value of said target pixel and for selectively establishing error diffusion coefficients to diffuse said error signal to multi-valued image signals corresponding to pixels in the vicinity of said target pixel, wherein the error diffusion coefficients are selectively established as a function of said density value of said target pixel; and a means for correcting said multi-valued image signal of said target pixel with error signals which have been weighted with a set of error diffusion coefficients.

2. A method of producing a binary image signal, comprising the steps of:

comparing a multi-valued image signal for a target pixel with a threshold signal to produce a binary image signal;

determining an error signal based on a difference between said multi-valued image signal and said binary image signal;

obtaining a density value of said target pixel;

selectively establishing error diffusion coefficients to diffuse said error signal to multi-valued image signals corresponding to pixels in the vicinity of said target pixel, wherein the error diffusion coefficients are established using said density value for said target pixel;

diffusing said error signal with said error diffusion coefficients; and correcting said multi-valued image signal of said target pixel with a sum of error signals which have been weighted with a set error diffusion coefficients.

\* \* \* \* \*